United States Patent
Svoiski

(10) Patent No.: US 7,558,151 B1
(45) Date of Patent: Jul. 7, 2009

(54) METHODS AND CIRCUITS FOR DDR-2 MEMORY DEVICE READ DATA RESYNCHRONIZATION

(75) Inventor: Mikhail Svoiski, Ottawa (CA)

(73) Assignee: Integrated Device Technology, Inc., San Jose, CA (US)

( * ) Notice: Subject to any disclaimer, the term of this patent is extended or adjusted under 35 U.S.C. 154(b) by 8 days.

(21) Appl. No.: 11/860,910

(22) Filed: Sep. 25, 2007

(51) Int. Cl.
*G11C 8/16* (2006.01)
*G11C 8/00* (2006.01)

(52) U.S. Cl. ............... 365/233.13; 365/193; 365/233.1
(58) Field of Classification Search .......... 365/233, 365/233.13
See application file for complete search history.

(56) References Cited

U.S. PATENT DOCUMENTS

| | | | |
|---|---|---|---|
| 6,316,980 B1 * | 11/2001 | Vogt et al. | 327/273 |
| 6,509,762 B1 * | 1/2003 | Moss et al. | 327/12 |
| 6,646,929 B1 * | 11/2003 | Moss et al. | 365/194 |
| 6,864,715 B1 * | 3/2005 | Bauer et al. | 326/46 |
| 6,972,998 B1 | 12/2005 | Gibson et al. | |
| 7,177,230 B1 * | 2/2007 | Huang | 365/233.1 |
| 7,184,508 B2 * | 2/2007 | Emberling | 375/372 |
| 7,318,167 B2 * | 1/2008 | Li et al. | 713/500 |
| 7,366,862 B2 * | 4/2008 | Nystuen et al. | 711/167 |
| 2002/0021586 A1 * | 2/2002 | Song et al. | 365/189.02 |
| 2004/0001380 A1 * | 1/2004 | Becca et al. | 365/202 |
| 2006/0055441 A1 * | 3/2006 | McClannahan et al. | 327/158 |
| 2008/0091903 A1 * | 4/2008 | Vergnes et al. | 711/167 |

OTHER PUBLICATIONS

Lau, William, "Overcoming DDR-2-Interface Challenges," EDN, Jan. 22, 2004, pp. 71-74.

* cited by examiner

*Primary Examiner*—Son L Mai
(74) *Attorney, Agent, or Firm*—Myers Bigel Sibley & Sajovec, P.A.

(57) ABSTRACT

The reliable capture of data from a DDR-2 memory device can be provided using timing signals provided by the DDR-2 memory device in conjunction with enable signals generated there from. The reliable capture of data from the DDR-2 DRAM can be used to extend the data valid window for which the captured data is provided to a system that is in communication with the memory controller. Extending the data valid window can enable the generation of a data valid strobe signal (that is synchronous with a system clock used to operate the system), which satisfies all timing requirements associated with interfacing the DDR-2 memory device to the system over a wide variation of process, voltage, and temperature.

20 Claims, 2 Drawing Sheets

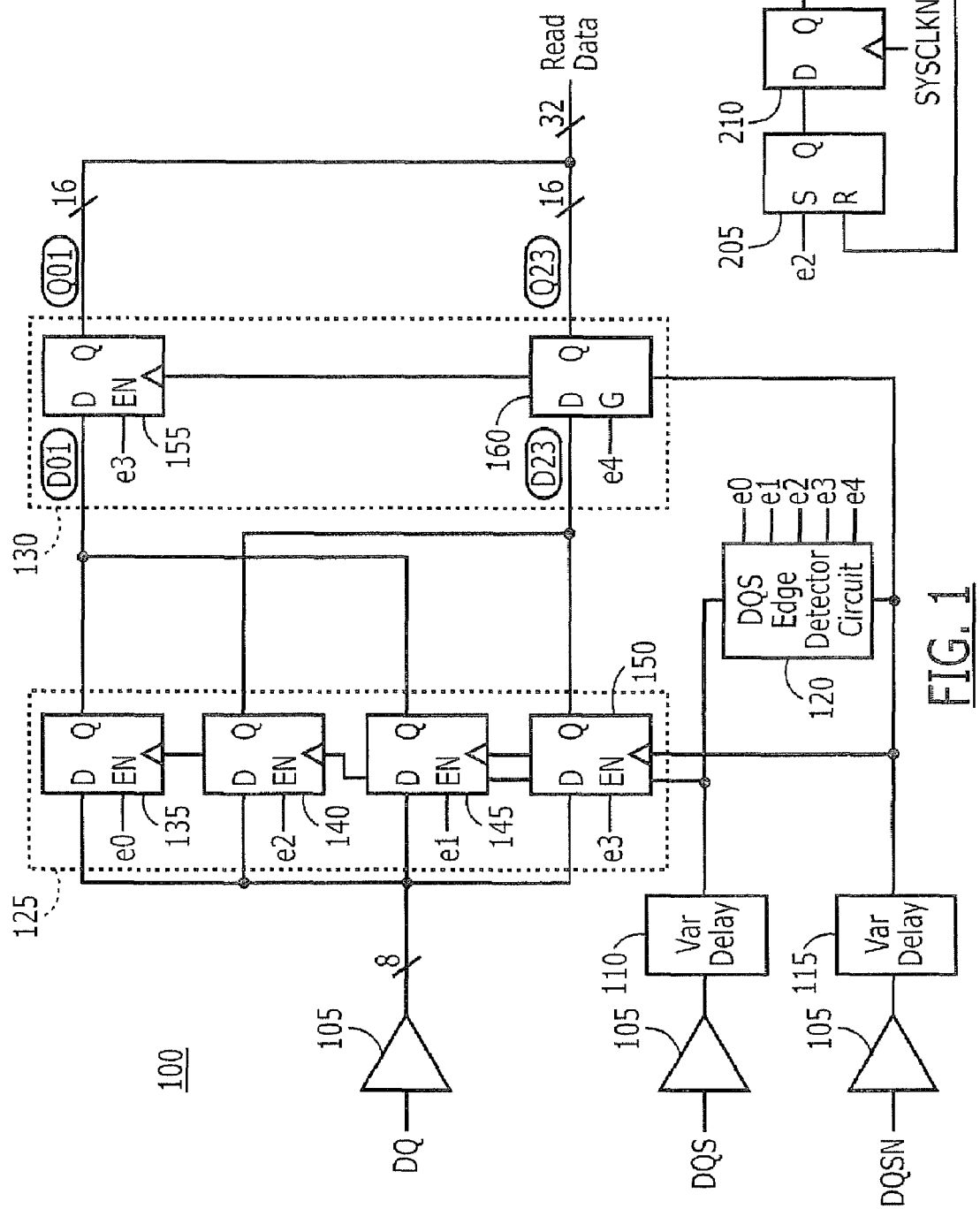

METHODS AND CIRCUITS FOR DDR-2 MEMORY DEVICE READ DATA RESYNCHRONIZATION

FIELD OF THE INVENTION

The invention relates to the field of electronics in general, and more specifically, to data synchronization in memory circuits.

BACKGROUND

DDR-2 DRAM memory devices can use both the rising and falling edges of a clock to transfer read data to a memory controller. Given the frequency at which these data transfers can occur (i.e., 200-333 MHz and beyond) delays introduced by elements in the data path, such as interconnect and devices, can be comparable with the period of the clock. In other words, the delays associated with interconnect, devices delays, and the like can be equal to about one clock period where the clock frequency is 200 MHz or higher. These delays can contribute to complications in performing synchronous transfer of data from the DDR-2 memory to the controller.

In particular, it is known to use delayed versions of signals provided by the DDR-2-type memories (i.e., DQS/DQSN signals) to clock registers in the memory controller. Given the relatively large delays described above, the timing relationship between the DQS/DQSN clock signals and a system clock (i.e., SYSCLK) may be unpredictable especially given variations associated with process, voltage, and temperature. This unpredictable timing relationship between DQS/DQSN and SYSCLK may therefore make it difficult to pass data directly from the DDR-2 DRAM to the system that operates using a different clock.

It is known to use an additional resynchronization stage to resynchronize data received from the DDR-2 DRAM at the memory controller. Such an approach is described in, for example, "Overcoming DDR-2-Interface Challenges" by William Lau, EDN Magazine, Jan. 22, 2004, pg. 71-74.

SUMMARY

Embodiments according to the present invention can provide the reliable capture of data provided by a DDR-2 Memory device using timing signals provided by the DDR-2 memory device in conjunction with enable signals generated there from. The reliable capture of data from the DDR-2 DRAM can be used to extend the data valid window for which the captured data is provided to a system that is in communication with a memory controller. Extending the data valid window can enable the generation of a data valid strobe signal (that is synchronous with a system clock used to operate the system), which satisfies the timing requirements associated with interfacing the DDR-2 memory device to the system over a wide variation of process, voltage, and temperature.

In some embodiments according to the invention, a method of transferring data received from a DDR-2 compliant memory device to a system operating using a system clock domain is provided by generating a data valid strobe signal synchronous with a system clock signal in the system clock domain from a control signal provided by a DDR-2 compliant memory device to indicate a data valid timing for data provided by the DDR-2 compliant memory device.

In further embodiments according to the invention, the control signal provided by the DDR-2 compliant memory device is a DQS or DQSN signal from the DDR-2 compliant memory device. Detecting sequential transitions of the DQS or DQSN signal can be used to provide a sequential series of enable signals that indicate availability of separate words of time multiplexed data provided by the DDR-2 compliant memory device. One of the enable signals can be, at least dual-rank synchronized, using the system clock to provide the data valid strobe signal.

In further embodiments according to the invention, data provided by the DDR-2 compliant memory device is stored in a primary stage DDR-2 clock domain storage device using the control signal provided by the DDR-2 compliant memory device. The data is transferred from the primary stage DDR-2 clock domain storage device to a secondary stage DDR-2 clock domain storage device to provide the data to the system during the data valid timing.

BRIEF DESCRIPTION OF THE DRAWINGS

FIG. 1 is a schematic representation of a circuit used to capture data provided by a DDR-2 memory device.

FIG. 2 is a synchronizer circuit that generates a data valid strobe signal synchronous with a system clock.

DETAILED DESCRIPTION OF PREFERRED EMBODIMENTS

Figure 3:
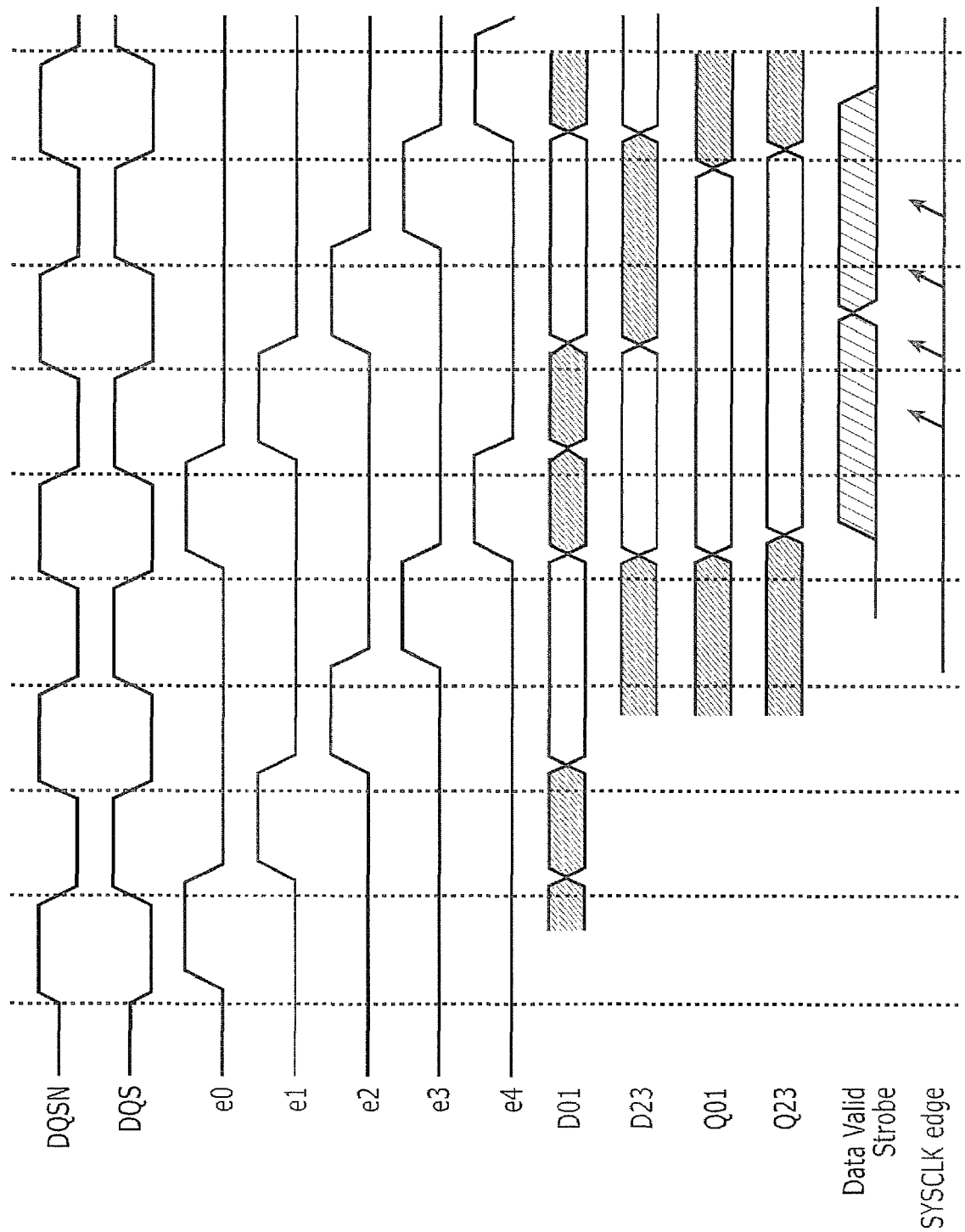
FIG. 3 is a timing diagram that illustrates operations of the circuit shown in FIG. 1 and the synchronizer circuit shown in FIG. 2 in some embodiments according to the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As described herein below in greater detail, embodiments according to the present invention can provide the reliable capture of data provided by a DDR-2 Memory device using timing signals provided by the DDR-2 memory device in conjunction with enable signals generated therefrom. The reliable capture of data from the DDR-2 DRAM can be used to extend the data valid window for which the captured data is provided to a system that is in communication with a memory controller. Extending the data valid window can enable the generation of a data valid strobe signal (that is synchronous with a system clock used to operate the system), which satisfies the timing requirements associated with interfacing the DDR-2 memory device to the system over a wide variation of process, voltage, and temperature.

The extended data valid window can be provided by using a series arrangement of two stages of data capture in the memory controller. For example, the first stage of data capture can be used to capture the time-multiplexed data as it is provided to the memory controller by the DDR-2 memory device. The second stage of the data capture can provide the data (transferred from the primer stage) to the system while the primary stage is then used to capture the next data words received from the DDR-2 memory device. In other words, the secondary stage can be used to provide data to the system while the primary stage buffers the secondary stage from the new data received from the DDR-2 memory device.

In still further embodiments according to the invention, the memory controller circuit can be used to count transitions of control signals provided by the DDR-2 DRAM (such the DQS or DQSN signals) to provide a sequential series of enable signals, each of which indicates the availability of a separate word of time multiplexed data provided by the DDR-2 memory device. In particular, the series of enable signals can be timed to indicate when it is estimated that data provided by the DDR-2-type DRAM will arrive at the memory controller so that it may be captured in the primary stage. Furthermore, enable signals may be generated to operate the secondary stage so that data captured in the primary stage can be transferred to the secondary stage and thereby ultimately provided to the system. Furthermore, one of the series of enable signals can be used as an input to a synchronizer circuit to position the data valid strobe signal an approximate center of the data valid window (provided by the secondary stage) over a wide range of operations so that data valid strobe is guaranteed to signal the time when the data provided by the memory controller is, in fact, valid and therefore can be reliably clocked using a system clock signal.

As used herein, a clock domain is defined as that part of the system driven by either a single clock or clocks that have constant phase relationships. A clock and its inverted clock or its derived divide-by-two clocks are considered to be within the same clock domain (i.e., synchronous with one another). Conversely, domains that have clocks with variable phase and time relationships are considered to be in different clock domains. The system described herein includes two clock domains: a system clock domain and a DDR-2 clock domain. As described herein, the circuits and method according to the invention can provide for the transfer of data from the DDR-2 clock domain directly to the system clock domain without the use of an intervening clock domain.

FIG. 1 is a schematic illustration of a circuit 100 used to capture data provided by a DDR-2 compliant memory device in some embodiments according to the invention. In particular, the circuit 100 is included in a memory controller that interfaces a system (not shown) with a DDR-2 compliant memory device (also not shown). The DDR-2 compliant memory device provides data to the circuit 100 via eight lines labeled DQ along with control signals DQS and DQSN. The data and the control signals DQS and DQSN are received by the circuit 100 via buffers 105.

The data (DQ) is provided as a series of eight-bit data words that are time multiplexed onto the eight DQ lines. For example, the DDR-2-compliant memory device can provide four sequential 8-bit data words in response to a read operation, where each of the eight-bit data words is multiplexed onto the DQ data lines at a different time. It will be understood that the term "DDR-2 memory device" includes any memory device (SRAM, DRAM, etc.) which provides data on both the rising and falling edges of a clock signal, such as those that are compliant the JEDEC JESD79-2A standard, which can be found at www.jedec.org/download/search/JESD79-2B.pdf.

In addition, the data is multiplexed onto the DQ data lines on both the rising and falling edges of the clock DQS/DQSN. In particular, the first eight-bit data word is provided on the rising edge of the DQS control signal, whereas the second eight-bit data word is provided on the falling edge of the DQS control signal (which is equivalent to the rising edge of the DQSN control signal). Furthermore, the third data word is provided by the DDR-2-compliant memory device on the next rising edge of the DQS control signal, whereas the fourth data word is provided on the falling edge of the next DQS control signal (which is equivalent to the rising edge of the next DQSN control signal).

The primary stage 125 is coupled to the DQ data lines and includes four separate clocked storage devices, each of which is configured to hold a separate eight-bit data word provided by the DDR-2-compliant memory device. According to FIG. 1, a register device 135 is configured to store the first eight-bit data word provided by the DDR-2-compliant memory device, a second register device 145 is configured to store the second data word, a third register device 140 is configured to store the third data word, whereas a fourth register device 150 is configured to store a fourth data word received from the DDR-2-compliant memory device. Therefore, the register devices 135-150 included in the primary stage 125, can store four complete sequential data words provided by the DDR-2-compliant memory device in response to a read operation.

A DQS edge detector circuit 120 is coupled to a delayed version of the DQS control signal, as well as a delayed version of the DQSN control signal. In operation, the DQS edge detector circuit 120 detects transitions of the DQS and DQSN control signals and provides a series of enable signals each of which indicates the availability of a separate word of the time multiplexed data provided by the DDR-2-compliant memory device. For example, enable signal E0 indicates the availability of the first data word on the data lines (DQ). Likewise, enable signals E1-E3 indicate the availability of respective separate words of the time-multiplexed data provided by the DDR-2-compliant memory device. The respective enable signal is provided to the registered device that is configured to store the corresponding data word. For example, enable signal E0 is provided to the first register device 135 so that the appropriate rising edge of the control signal DQS is used to clock the data into the first register device 135 at the time when the first data word provided by the DDR-2-compliant memory device should be available on the data lines (DQ).

A secondary stage 130 is coupled to the outputs of the primary stage 125. The secondary stage 130 is controlled to receive the first four data words stored in the primary stage 125 before the next subsequent transfer of four data words is received from the DDR-2-compliant memory device. In other words, the secondary stage 130 is configured to receive and store a first set of four data words from the primary stage 125 before the primary stage 125 is clocked to receive a second set of four data words. The secondary stage 130 operates to provide the four data words as 32 bits of read data to the system.

According to FIG. 1, the data words stored in the first and second registered devices 135 and 145 are provided to a fifth register device 155 included in the secondary stage 130. Similarly, the third and fourth data words stored in the register devices 140 and 150 are provided to a sixth storage device 160 included in the secondary stage 130. It will be understood that in some embodiments according to the invention, the storage device 160 included in the secondary stage 130 is a transparent latch that operates responsive to the enable signal E4 so that the latch becomes transparent when E4 is asserted whereupon data stored in the third and fourth register devices 140 and 150 becomes available at the outputs of the latch (after a propagation delay). Furthermore, when the enable signal E4 is deasserted, the transparent latch closes and latches the data transferred from the third and fourth register devices 140 and 150 in the secondary stage 130.

As further shown in FIG. 1, the lower two data words provided to the register device 155 in the secondary stage 130 are clocked on the same clock edge that is used to clock the fourth data word into the primary stage 125. Furthermore, the transparent latch 160 used to store the two upper data words in the secondary stage 130 is controlled by the enable signal E4 which tracks the operation of enable signal E0. In particular, E4 and E0 are both asserted and deasserted at the same time by the DQS edge detector circuit 120. In particular, both E0 and E4 are asserted and deasserted at the same time.

FIG. 2 is a schematic illustration of a synchronizer circuit used to transfer data received from the DDR-2-compliant memory device to the system using a clock signal (i.e., SYSCLK) that is in the system clock domain in some embodiments according to the invention. In particular, an enable signal E2 is provided to an input of an S-R flip flop which causes the output thereof to be asserted at the input of a first clock device 210 included in the synchronizer circuit 200. The input at the first clock device 210 is transferred to the output on the next rising edge of SYSCLKN, which is provided to a second clock device 215 as well as fed-back to a reset input on the S-R flip flop 205. The feedback to the reset input of the flip-flop 205 shapes the input to the first clock device 210 so the output is in the shape of a pulse. In other words, the feedback from the first clock device 210 is used to create both a high going and low going transition of the data valid strobe signal to provide a pulse rather than a single transition producing a static output.

The second clock device 215 clocks the input through to the output on the next rising edge of SYSCLKN to provide the data valid strobe signal to indicate that read data provided by the secondary stage 130 shown in FIG. 1 is available to be clocked by the system. It will be understood that the enable signal E2 is selected to compensate for interconnect and propagation delays inherent in the system as well as the timing variations introduced by process, voltage, and temperature so that the data valid strobe signal is asserted when valid data is provided by the secondary stage 130. Accordingly, the first and second clock devices provide two levels of synchronization for the generation of the data valid strobe signal synchronous with the SYSCLK (i.e, dual rank synchronization).

FIG. 3 is a timing diagram that illustrates operations of the circuits shown in FIGS. 1 and 2 used to transfer data from a DDR-2 clock domain to a system clock domain in some embodiments according to the invention. According to FIG. 3, DQS and DQSN are control signals provided by the DDR-2-compliant memory device and are 180° out-of-phase with one another. Data is provided by the DDR-2 compliant memory device on each rising edge of DQS and DQSN. It will be understood that DQS and DQSN are both delayed by the memory controller so that the edges of DQS and DQSN occur when valid data is provided by the DDR-2 compliant memory device on the data lines DQ. Furthermore, the DDR-2 compliant memory device can provide four consecutive eight-bit data words at separate times to the memory controller. The eight-bit data words provided by the DDR-2 compliant memory device are time multiplexed onto the data lines whereupon the memory controller is configured to separately clock each of the eight-bit data words at a predetermined time into the primary stage.

As described above in reference to FIG. 1, the DQS edge detector circuit 120 generates a series of enable signals that indicate the availability of the separate words of time-multiplexed data provided by the DDR-2 compliant memory device. As shown in FIG. 3, each of the enable signals E0-E3 corresponds to a time at which an associated eight-bit data word is provided by the DDR-2-compliant memory device as valid data on the data lines DQ. In particular, enable signal E0 is asserted after the first positive edge transition of the control signal DQS once a data transfer is begun by the DDR-2-compliant memory device. Accordingly, the first eight-bit data word from the DDR-2-compliant memory device is clocked into the primary stage 125 on the first rising edge of DQS. Subsequently, enable signal E1 is generated indicating (on the next rising edge of DQSN) that the second eight-bit data word provided by the DDR-2-complaint memory device is available to be clocked from the DQ signal lines. Accordingly, on the next rising edge of DQSN, the second eight-bit data word is clocked into the primary stage 125. Next, the enable signal E2 is generated so that the third eight-bit data word provided by the DDR-2-compliant memory device is clocked into the primary stage on the next rising edge of DQS. Finally, the enable signal E3 is generated so that the fourth consecutive data word provided by the DDR-2 compliant memory device is clocked into the primary stage 125 on the next rising edge of DQSN. Accordingly, four consecutive data words from the DDR-2 compliant memory device are stored in the primary stage 125 after four consecutive clock edges of DQS and DQSN. Furthermore, if the DDR-2 compliant memory device is requested to transfer additional data, the operation of the DQS and DQSN signals will continue so that the DQS edge detector circuit 120 continues operation and therefore begins a new cycle of generation of the enable signals E0-E3.

Still referring to FIGS. 2 and 3, the first and second register devices 135 and 145 store the first and second eight-bit data words after the rising edge of DQSN during the time when the enable signal E1 is asserted. Accordingly, the two lower eight-bit data words are stored in the primary stage 125 after the first rising edge of DQSN during the time when the enable signal E1 is asserted.

The third and fourth data words provided by DDR-2 complaint memory device are stored in the primary stage 125 after the second rising clock edge of DQSN during the time when the enable signal E3 is asserted. Therefore, after the rising edge of this DQSN signal, all four consecutive data words provided by the DDR-2 compliant memory device are stored in the primary stage 125 (shown as D01 representing the lower two data words and as D23 representing the upper two data words).

As further shown in FIGS. 2 and 3, simultaneous with the clocking of the fourth data word into the primary stage 125, the two lower data words stored in the primary stage 125 are transferred to the secondary stage 130 during the same rising edge of DQSN when the enable signal E3 is asserted. In other words, as the uppermost word from the DDR-2 compliant memory device is stored in the primary stage 125, the two lowest words in the primary stage 125 are simultaneously transferred to a lower portion of the secondary stage 130. Accordingly, after storing the two lower words in the secondary stage 130, those two words become valid on the read data lines provided by the memory controller 100 to the system (shown as Q01 in FIG. 3.

Immediately subsequent to the generation of the enable signal E3, the DQS edge detector circuit 120 generates an enable signal E4 that is provided to the transparent latch 160 in the secondary stage 130. Accordingly, the upper two words stored in the primary stage 125 are transferred to an upper portion of the secondary stage 130 when the enable signal E4 is asserted to the transparent latch 160 thereby becoming available as Q23 on the read data lines to the system. It will be understood that the enable signal E4 is generated simultaneous with the generation of the enable signal E0 for the next subsequent series of data words provided by the DDR-2-compliant memory device.

As shown in FIG. 3, Q01 and Q23 are both provided on the read data lines by the memory controller 100 to the system for an extended data valid window including at least three SYSCLK edges. This extended data valid window is provided by the secondary stage 130. In particular, the two lower words stored in the primary stage 125 are transferred to the secondary stage using E3, which is the last opportunity to transfer the data before the primary stage 125 is required to store a first data word of a next subsequent consecutive series of data words provided by the DDR-2 compliant memory device using the enable signal E0. In other words, the enable signal E3 is the enable signal that immediately precedes the enable signal E0. Accordingly, E3 is the last available enable signal for use to store data in the secondary stage 130 before the data stored by the primary stage 125 becomes invalid. Accordingly, the data in the secondary stage 130 on outputs Q01 is used to increase the amount of time that Q01 can be valid before new data from the primary stage 125 is transferred to the secondary stage 130.

As shown in FIGS. 2 and 3, the two uppermost words in the primary stage 125 are transferred to the transparent latch 160 included in the secondary stage 130 using the enable signal E4 that coincides with the enable signal E0. Accordingly, the two uppermost words of data provided by the DDR-2 compliant memory device are provided on the read data lines as Q23 when the enable signal E4 is asserted. The use of the transparent latch 160 controlled by the enable signal E4 allows the two uppermost words Q23 to be provided as valid data at approximately the same time that the lower two words are provided as Q01. Accordingly, the read data can be provided over an extended data valid window by the memory controller by transferring the upper and lower words into the secondary stage 130 at about the same time.

Concurrent with this, the enable signal E2 is selected for use as an input to the synchronizer circuit 200 shown in FIG. 2. The use of E2 as the input to the synchronizer circuit 200 ensures that the data valid strobe signal can be generated (using the SYSCLKN signal) synchronous with the system clock domain during the data valid window when both Q01 and Q23 are guaranteed to be provided on the read data lines to the system. In other words, even given the variation in timing due to interconnect and gate delays as well as the variations associated with process, voltage and temperature, the data valid strobe signal should occur no earlier than the transfer of the data words to the secondary stage 130 and no later than E3 during the subsequent cycle while still allowing for adequate setup and hold times so that the read data can be clocked by the system on a SYSCLK edge. Accordingly, the data provided by the DDR-2 compliant memory device can be transferred by the memory controller using the circuits shown in FIGS. 1 and 2 operating as outlined in FIG. 3 from the DDR-2 clock domain directly to the system clock domain without the use of any intervening clock domains such as those used in the conventional approaches. Moreover, the generation of the data valid strobe signal as described herein allows for a wide range of frequency independence so that the data is provided during the data valid window regardless of the operating frequency of the system or the DDR-2 device.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of transferring data received from a DDR-2 compliant memory device to a system operating using a system clock domain, the method comprising:
generating a data valid strobe signal synchronous with a system clock signal in the system clock domain from a control signal provided by a DDR-2 compliant memory device to indicate a data valid timing for data provided by the DDR-2 compliant memory device.

2. The method according to claim 1 wherein the control signal provided by the DDR-2 compliant memory device comprises a DQS or DQSN signal from the DDR-2 compliant memory device and generating a data valid strobe signal synchronous with a system clock signal further comprises:
detecting sequential transitions of the DQS or DQSN signal to provide a sequential series of enable signals that indicate availability of separate words of time multiplexed data provided by the DDR-2 compliant memory device; and
at least dual-rank synchronizing one of the enable signals using the system clock to provide the data valid strobe signal.

3. The method according to claim 1 further comprising:
storing data provided by the DDR-2 compliant memory device in a primary stage DDR-2 clock domain storage device using the control signal provided by the DDR-2 compliant memory device; and
transferring the data from the primary stage DDR-2 clock domain storage device to a secondary stage DDR-2 clock domain storage device to provide the data to the system during the data valid timing.

4. The method according to claim 3 wherein the control signal provided by the DDR-2 compliant memory device is included in a DDR-2 clock domain so that no intervening clock domains are used to transfer the data from the DDR-2 clock domain to the system clock domain.

5. The method according to claim 3 wherein storing data provided by the DDR-2 compliant memory device in a primary stage DDR-2 clock domain storage device comprises storing four sequentially received time multiplexed data words provided by the DDR-2 compliant memory device.

6. The method according to claim 3 wherein transferring the data from the primary stage DDR-2 clock domain storage device to a secondary stage DDR-2 clock domain storage device comprises transferring first and second received data words to the secondary stage DDR-2 clock domain storage device and storing a fourth received data word in the primary stage DDR-2 clock domain storage device on a common DQS or DQSN signal edge.

7. The method according to claim 6 wherein transferring the data from the primary stage DDR-2 clock domain storage device to a secondary stage DDR-2 clock domain storage device further comprises:
transferring third and fourth received data words to a transparent latch responsive to an enable signal substantially simultaneous with receiving a first data word included in a second set of four data words received from the DDR-2 compliant memory device.

8. The method according to claim 7 wherein the enable signal comprises one of a sequential series of enable signals that indicates availability of a third received data word provided by the DDR-2 compliant memory device.

9. A method of transferring data received from a DDR-2 compliant memory device to a system operating using a system clock domain, the method comprising:
storing four consecutively received data words received from a DDR-2 compliant memory device in a combination of a primary storage stage and a secondary storage stage both operating in a DDR-2 clock domain.

10. The method according to claim 9 further comprising:
transferring first and second received data words of the four consecutively received data words from the primary storage stage to the secondary storage stage and storing a fourth received data word of the four consecutively received data words in the primary storage stage on a common DQS or DQSN signal edge.

11. The method according to claim 10 wherein transferring first and second received data words further comprises:
  transferring third and fourth received data words of the four consecutively received data words from the primary storage stage to a transparent latch in the secondary storage stage substantially simultaneous with receiving a first data word included in a second set of four data words received from the DDR-2 compliant memory device.

12. The method according to claim 9 further comprising:
  transferring the four data words to the system from the DDR-2 clock domain directly to a system clock domain.

13. A synchronizer circuit for transferring data received from a DDR-2 compliant memory device to a system operating using a system clock domain, the synchronizer circuit comprising:
  a clock input configured for coupling to a system clock signal operating in the system clock domain provided by a DDR-2 compliant memory device;
  a data input configured for coupling to one of a sequential series of enable signals that indicates availability of a third received data word provided by the DDR-2 compliant memory device included in four consecutive data words; and
  an output to provide a data valid strobe signal synchronous with the system clock signal to indicate a data valid timing for the four consecutive data words provided by the DDR-2 compliant memory device to the system operating using the system clock domain.

14. The circuit according to claim 13 wherein the synchronizer circuit comprises a dual-rank synchronizer circuit clocked by the system clock signal.

15. The circuit according to claim 13 wherein the one of the sequential series of enable signals is included in a DDR-2 clock domain and the four consecutive data words are transferred directly from the DDR-2 clock domain to the system clock domain by the synchronizer circuit.

16. The circuit according to claim 9 wherein the sequential series of enable signals indicate the availability of data provided by the DDR-2 compliant memory device only when data is actively being provided by the DDR-2 compliant memory device.

17. A circuit for transferring data received from a DDR-2 compliant memory device to a system operating using a system clock domain, the circuit comprising:
  a primary stage DDR-2 clock domain storage device configured to store data provided by the DDR-2 compliant memory device responsive to a DQS or DQSN signal provided by the DDR-2 compliant memory device;
  a secondary stage DDR-2 clock domain storage device, coupled to outputs of the primary stage DDR-2 clock domain storage device, configured to receive data stored in the primary stage DDR-2 clock domain storage device to provide the data to the system during a data valid timing; and
  a dual-rank synchronizer circuit, configured to provide a data valid strobe signal, synchronous with a system clock signal in the system clock domain, using a DDR-2-clock domain timing signal as an input to indicate availability of valid data for the system during the data valid timing.

18. The circuit according to claim 17 wherein the primary stage DDR-2 clock domain storage device comprises a first clocked register having clocked inputs coupled to the DQS signal provided by the DDR-2 compliant memory device and a second clocked register having clocked inputs coupled to the DQSN signal provided by the DDR-2 compliant memory device; and
  wherein the secondary stage DDR-2 clock domain storage device comprises a clocked register having clocked inputs coupled to the DQSN signal provided by the DDR-2 compliant memory device and a transparent latch having a DDR-2 clock domain enable signal, coupled an enable input, indicating immediately previous clocking of a fourth data word into primary stage DDR-2 clock domain storage device.

19. The circuit according to claim 18 wherein the primary and secondary stage DDR-2 clock domain storage devices are each configured to store four sequential consecutive data words provided by the DDR-2 compliant memory device.

20. The circuit according to claim 19 wherein the DDR-2 clock domain timing signal is included in a DDR-2 clock domain and the data is transferred directly from the DDR-2 clock domain to the system clock domain.

* * * * *